May 21, 1957   J. M. HOFF   2,792,903
METHOD OF AND APPARATUS FOR RECOVERING
ENRICHED GASEOUS MIXTURES
Filed Feb. 2, 1952   2 Sheets-Sheet 1

Inventor
Jean M. Hoff
by Hill, Sherman, Meroni, Gross & Simpson Attys

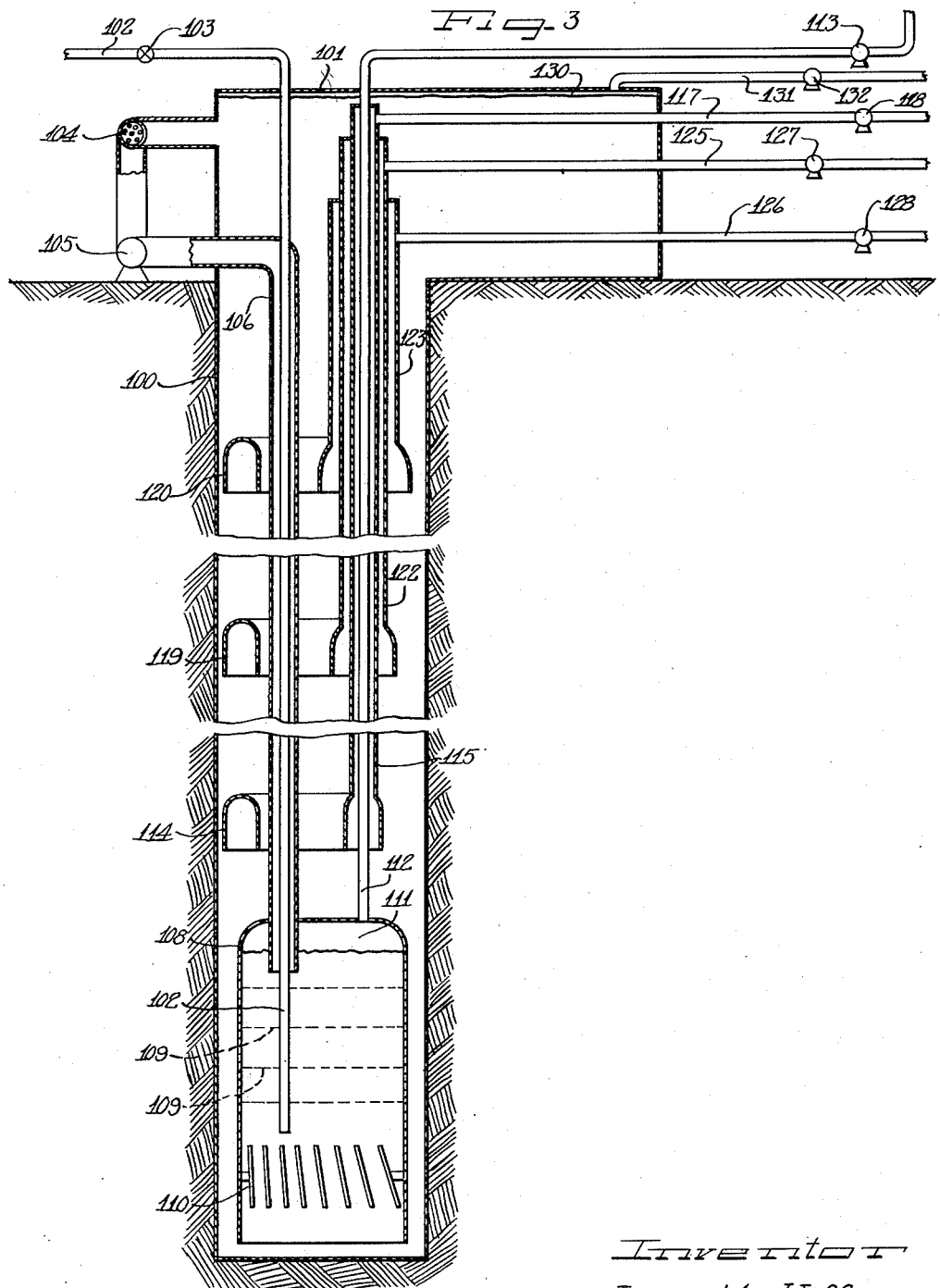

United States Patent Office 2,792,903
Patented May 21, 1957

2,792,903
METHOD OF AND APPARATUS FOR RECOVERING ENRICHED GASEOUS MIXTURES

Jean M. Hoff, Evanston, Ill.

Application February 2, 1952, Serial No. 269,677

6 Claims. (Cl. 183—2)

The present invention relates to the recovery of an enriched gaseous mixture from a relatively lean mixture of gases.

The method of the present invention takes advantage of the differing solubility characteristics of common gases in hydrocarbon solvents. Hydrocarbon solvents are more or less selective solvents for various common gases and in the present invention these solvents may be employed to separate oxygen from nitrogen where air is the gas stream being treated and to separate methane from nitrogen where natural gas is being treated. In a preferred embodiment of the present invention, the enrichment of a given gas stream with respect to one component thereof takes place in a plurality of separation stages with substantial pressure differentials existing between the various stages. In this way, a substantial amount of the energy contained in the gas streams can be recovered and employed for useful work.

An object of the present invention is to provide a system for the recovery of enriched gaseous mixtures at a substantial saving in operating cost.

Another object of the present invention is to provide a method for concentrating one of the components in a gaseous mixture while providing a large amount of available refrigeration capacity.

Still another object of the present invention is to provide an apparatus for recovering enriched gaseous mixtures by selective dissolution in a hydrocarbon solvent.

Another object of the present invention is to provide an apparatus for the recovery of enriched gaseous mixtures including means for recovering a large part of the energy supplied to the gaseous mixture.

A further description of the present invention will be made in conjunction with the attached sheets of drawings which illustrate three systems employing the principles of the present invention.

In the drawings:

Figure 3 is a fragmentary view in elevation of a gas recovery unit in an underground installation.

As shown on the drawings:

Figure 1:
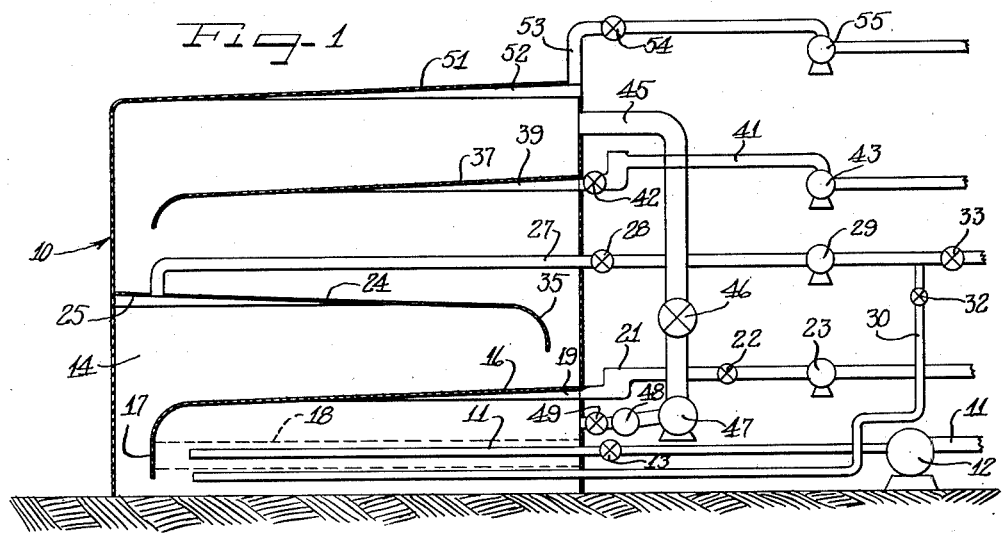
Figure 1 is a schematic view with parts in elevation illustrating a system for the recovery of oxygen-enriched gas mixtures from air using a hydrocarbon solvent.

In the assembly of Figure 1, reference numeral 10 denotes generally a cylindrical casing of a height sufficient to create a substantial hydrostatic head when the casing 10 is filled with a solvent. In the practice of the present invention, many different types of solvents may be employed, including the relatively light hydrocarbons such as liquid methane, propane, and the like, but I prefer to use solvents having at least 5 carbon atoms per molecule, i. e., members of the hydrocarbon series beginning with pentane. The higher molecular weight compounds up to and including relatively heavy gas oils recovered from petroleum refining can also be employed, although the solubility of the common gases in the relatively heavy gas oils is not as great as it is in members of the hydrocarbon series from pentane to octane, nor are the solubility ratios as favorable. Where the processes are directed to the recovery of enriched oxygen mixtures from air, water may be employed as the solvent. For the separation of nitrogen from natural gas, carbon tetrachloride is a suitable solvent.

The unit of Figure 1 will be described in operation for the separation of an oxygen-enriched fraction from fresh air, using liquid pentane as the solvent. Fresh air is introduced into the casing from a conduit 11 and is pumped into the casing 10 by means of a pump 12. A valve 13 controls the rate of flow of fresh air into the system.

The conduit 11 may be provided with perforations in the portion of its length within the casing 10 to introduce the fresh air as a plurality of finely dispersed streams. A pair of perforated plates, 18, disposed above and below the conduit 11 to reduce turbulence and maintain a stage-wise effect in the separating chamber.

A body of liquid pentane 14 of substantial height is contained within the casing 10. Near the base of the casing, the hydrostatic pressure due to the height of the column of liquid in the casing 10 provides a relatively high pressure to the air introduced by means of the conduit 11. Under conditions of elevated pressures, oxygen is quite soluble in liquid pentane while nitrogen is only moderately soluble. Under these conditions, the gaseous mixture dissolved in the liquid pentane in the absorption zone at the base of the casing 10 has a proportionately higher concentration of oxygen than does the air entering the conduit 11. For most economical results, enough air is introduced into the system to saturate the solvent with dissolved gases.

As more air is introduced into the system from the conduit 11, gas bubbles are liberated from the solvent and tend to rise toward the top of the casing. In rising, the bubbles are stopped by an inclined baffle or trap 16 secured in fixed relation to the walls of the casing 10. The baffle 16 has a downwardly turned end portion 17. After a sufficient number of bubbles have been liberated through the body of the solvent, a vapor space 19 is formed between the surface of the baffle 16 and the level of the solvent included beneath the baffle 16. The vapor space 19 communicates with an exit line 21 for venting off gases liberated into the vapor space 19. At equilibrium conditions, the gases leaving through the line 21 will be relatively nitrogen rich and lean with respect to oxygen. A valve 22 in the line 21 is used to control the rate of flow of gases through this line. A pump 23 withdraws the gas from the line 22 as rapidly as possible, so the vapor space 19 may be relatively small. The vapor space 19 is kept as small as possible to minimize the effects of any explosion which might occur.

Any gas bubbles which do not collapse against the surface of the baffle 16 tend to migrate beneath the depending end portion 17 of the baffle 16, and rise with the circulating solvent 14 to the surface of a second baffle 24 disposed at a substantial elevation from the baffle 16. Since the baffle 24 is disposed in a portion of the chamber which is at lower relative pressure than the baffle 16, and since the degree of solubility of oxygen in pentane varies in proportion to the pressure on the solvent, additional amounts of oxygen previously dissolved in the solvent 14 are liberated as bubbles and eventually form a second vapor space 25 below the level of the baffle 24. A conduit 27 associated with the baffle 24 is employed to remove the oxygen-enriched mixture in the vapor chamber 25, the flow of the gas through the conduit 27 being regulated by means of a valve 28. The gaseous mixture leaving through the conduit 27 may be compressed by means of a compressor 29 and a portion thereof recycled to the absorption zone by means of a branch line 30, and is preferably introduced below the level of inlet conduit 11 (so that the solvent flowing downwardly in the absorption zone from the valve 49 contacts and enters into equilibrium with the fresh air from the conduit 11 first and then contacts and enters into equilibrium with the recycled gases from the header 30 before passing downwardly under the baffle depending portion 17 and out of the absorption zone). Control of the volume of gas being recirculated is afforded by the provision of a valve 32 in the line 30. A second valve 33 in the line 27 controls the flow of that portion of the gaseous stream which is not recycled through the line 30.

The stream of solvent containing dissolved gases is then directed beneath a depending end portion 35 on the baffle 24 and rises to where it contacts the surface of a third upwardly inclined baffle 37. As the solvent 14 rises between the baffle 24 and the baffle 37, additional amounts of dissolved oxygen are liberated, together with much of the remaining nitrogen, the liberated gases being collected in a vapor space 39 between the surface of the baffle 37 and the level of the liquid immediately beneath the baffle. The composition of the gas mixture at this stage contains still greater amounts of oxygen and correspondingly smaller amounts of nitrogen. The gases are then vented through a line 41, controlled by a valve 42 and pass into a compressor unit 43 where the gases are compressed and passed to storage means, or used in processes requiring a relatively high oxygen content gaseous mixture.

The solvent 14 is constantly recirculated by providing a conduit 45, a valve 46, and a pump 47. The pump 47 delivers the circulating solvent through a heat exchanger 48 where the liquid is cooled. The heat exchanger 48 may be also used to remove excess refrigeration capacity if such excess is present, or to cool the liquid if insufficient refrigeration capacity appears. After heat exchange, the solvent passes through a valve 49 back into the absorption zone beneath the level of the baffle 16 where it dissolves additional quantities of the fresh air being introduced.

The fraction containing the highest relative percentage of oxygen is recovered at the top of the casing 10, the top wall 51 of the casing being upwardly inclined to provide a vapor space 52 into which the gases liberated from the solvent in the space between the baffle 37 and the wall 51 are collected. A conduit 53 delivers the oxygen-rich gaseous mixture through a valve 54 and into a pump 55 for subsequent storage or use.

The amount of oxygen enrichment between the various stages will, of course, depend upon the temperature of the solvent, the pressure differential existing between the various separation stages, and the proportion of the dissolved gases which have been liberated in previous stages. Because the solubility of oxygen increases rapidly with a decrease in the temperature of the hydrocarbon solvent, it is preferable to operate the process at as low a temperature as possible. The pressure conditions may similarly be varied over a wide range, but I prefer to operate the unit described in Figure 1 as such that a pressure differential of approximately 15 pounds per square inch exist between the top of the liquid column and its base. Preferably, the air entering the tank is at about atmospheric pressure, while the top of the tank is at a very low pressure, such as 1 or 2 p. s. i. absolute.

Figure 2:
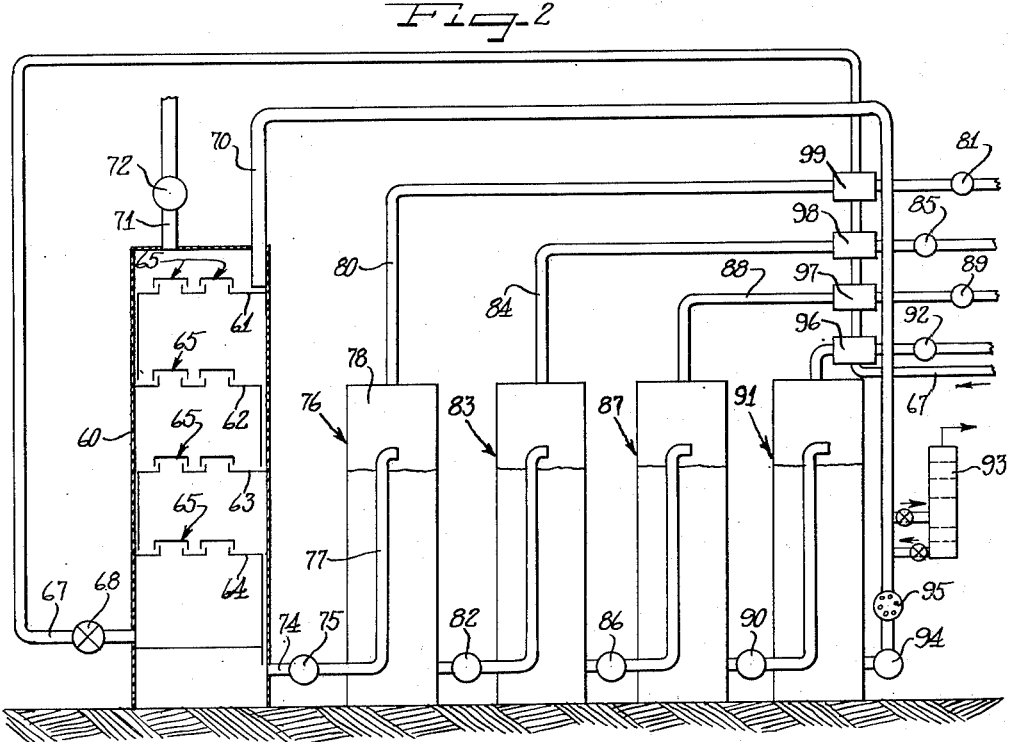
Figure 2 is a schematic view with parts in elevation of a modified assembly including an absorbing unit and separating units arranged in series.

In the form of the invention illustrated in Figure 2, a separate absorbing unit and a series of separating units are provided. The absorbing unit including vertically spaced liquid-gas contacting means which in the illustrated form of the invention include a series of plates 61, 62, 63 and 64, each of the aforementioned plates including a plurality of bubble caps 65. The gas stream to be treated, which may be a mixture of nitrogen and methane, is introduced into the column 60 through a line 67 controlled by a valve 68. Before entering the column, the inlet gas is passed into heat exchange relationship with a plurality of heat exchangers 96, 97, 98 and 99 in the exit lines asociated with the various recover stages. As the gas mixture rises within the column, the gases are scrubbed countercurrently with a liquid hydrocarbon solvent entering the top of the column through a line 70. Since methane is considerably more soluble in hydrocarbon than is nitrogen, the concentration of methane in the dissolved gases is higher than the concentration of dissolved nitrogen. Residual undissolved nitrogen is vented from the column 60 through an exit line 71 to operate a turbine 72 and thereby recover a substantial amount of the energy contained in the exit gas.

The liquid solvent, containing dissolved methane and nitrogen is withdrawn from the base of the column 60 through a conduit 74 to drive a fluid-operated turbine 75. In place of the turbine 75, and the succeeding turbines, check valves may be employed. The liquid solvent then passes into a first separating chamber 76 through an inlet pipe 77. This separating chamber 76 is operated at a substantially lower pressure than the pressure in the column 60 so that proportionately greater amounts of the less soluble gas, nitrogen, and proportionately smaller amounts of methane are released into a vapor space 78 above the level of liquid solvent in the chamber 76. This gaseous fraction is withdrawn through a conduit 80 and is compressed by means of a compressor 81.

The liquid solvent in chamber 76 is continuously withdrawn and operates a liquid driven turbine 82. The liquid thereupon passes into a second separating chamber 83 maintained at a pressure substantially less than the existing pressure in chamber 76. Additional amounts of nitrogen and methane are volatilized in this chamber, the liberated gaseous mixture passing through an exit line 84 into a compressor 85.

The cycle is repeated in succeeding separation chambers, the liquid in the chamber 83 being used to drive a turbine 86 and then being introduced into a third separating chamber 87. This third chamber 87 is operated at a pressure lower than either the preceding separating chambers 76 and 83, so that additional quantities of nitrogen and methane are vented from the chamber 87 through a line 88 and into a third compressor 89. The vented gases are heat exchanged with the incoming gas stream in the heat exchanger 96 through 99, as previously noted, so that the system can be operated at very low temperatures. At such lower temperatures very light hydrocarbons such as propane can advantageously be employed as solvents.

The liquid solvent containing residual nitrogen and relatively large quantities of methane is then introduced through a turbine 90 into a fourth separating chamber 91 which operates at the lowest pressure of any of the separating chambers in series. A relatively methane-rich fraction is recovered from the chamber 91 and passes to a compressor 92. Thus, each succeeding stage gives off fractions which are progressively richer in methane.

Residual solvent is withdrawn from the base of the separating chamber 91 and is pumped by means of a pump 94 through a heat exchanger 95 where the solvent is cooled, if necessary, and returned to the column 60 through the conduit 70. A stripper 93 is associated with the line 70 to remove hydrocarbons such as propane and butane which occur in small amounts in natural gas. The solvent freed from these components is then returned to line 70.

In each of the three forms of the invention illustrated, the ratio of the volume of solvent to the amount of inlet gas should be carefully controlled. If too little solvent is used insufficient amounts of the more soluble gas will be dissolved, so that the less soluble gas liberated will carry with it too much of the desired more soluble gas. On the other hand, if too much solvent is employed, the solvent will dissolve excessive quantities of the less soluble gas, and the less soluble gas will appear as a contaminant in the product stream. For any mixture of gases, the ratios to be employed can be readily ascertained after a few preliminary runs by analysis of the various gaseous streams recovered.

The system illustrated in Figure 2 is particularly useful for raising the methane concentration of natural gas being pumped through a pipe line. The following example illustrates how a natural gas composition containing about 88% methane and 12% nitrogen can have its methane concentration increased to a value of about 98.7%.

Assuming a pipe line operating at a flow of 70,000 cubic feet per minute, at a live pressure of 1000 lbs. per sq. in., 7000 horsepower would be required to recompress the treated gas from the pressures existing in the release chambers back to a pressure of 1000 pounds per square inch gauge. At the same time, about 900 cubic feet per minute of solvent must be raised from atmospheric pressure to a pressure about 1000 pounds per square inch. This amounts to 1440 foot pounds per minute per cubic foot of solvent or 4.37 horsepower per cubic foot of solvent. Consequently, the total horsepower involved for recompression of the gas and circulation of the solvent is approximately 11,000 horsepower.

The incoming gas has about 260 horsepower of reversible energy for every 1000 cubic feet per minute. A total of 18,200 horsepower in reversible energy, therefore, enters the system. With the reduction of the nitrogen content from 12% to 1.3%, the nitrogen leaving the system will contain 1930 horsepower of reversible energy.

With these values, the pump 94 of Figure 2 should have a rating about 4000 horsepower, while the compressors 81, 85, 89 and 92 should have a total capacity of about 7000 horsepower. The turbine 72 acted upon by the waste nitrogen should have a rating of about 1350 horsepower, assuming a turbine efficiency of 70%. If the process is operated under lower temperature conditions, the volume of solvent is reduced, and the corresponding power requirements reduced.

The modified form illustrated schematically in Figure 3 employs an underground installation and is particularly designed for increasing the methane content in a natural gas composition containing methane and nitrogen. This system has the advantage of eliminating pumping of the liquid to a high pressure zone, by making use of a hydrostatic head to achieve this purpose. In this form of the invention, a long cylindrical housing 100 is sunk in the earth, the housing 100 having an enlarged upper housing 101 above the level of the earth's surface. A stream of natural gas is introduced into the housing 100 through a line 102 controlled by a valve 103. A hydrocarbon solvent is continuously withdrawn from the housing 101 and passes through a heat exchanger 104 before passing through a turbine 105. Cooled solvent is then introduced by means of a conduit 106 which is substantially concentric with the line 102.

The solvent and inlet gas enter an enlarged casing 108 and near the base of the housing 100 where the solvent is maintained under a substantial hydrostatic head and is capable of dissolving relatively large quantities of the gas. The solvent strikes a vaned wheel 110 secured to the casing 108, causing the fluid to rotate, thereby assisting in agglomeration of gas bubbles and reduction of entrapment and carryover. The gases rise to the top of the casing 108 into a vapor space 111 above the level of the solvent in the casing 108. A plurality of vertically spaced perforated plates 109 decrease the turbulence of the solvent streams and prevent churning. The gas in the vapor space 111 has a relatively high nitrogen content, and gases from this space may be continuously removed by means of a conduit 112 in communication with the vapor space 111. After the gases rise to the surface, the nitrogen-rich fraction is passed through a turbine 113 where the energy content of the gases is transformed into useful work before being vented to the atmosphere or otherwise disposed of.

The remaining solvent containing substantial amounts of dissolved gases flows beneath the casing 108 and into the annular space between the walls of the casing 108 and the housing 100. As the liquid solvent rises, more gas is liberated. An annular gas trap 114 collects these liberated gases and a conduit 115 directs the gas fraction into an exit line 117 and then into a compressor 118. Similarly, as the gases are liberated due to the decrease in pressure on the solvent as it rises in the casing 100, additional annular gas traps 119 and 120 collect the gaseous fractions at intermediate points, and these gas fractions are collected in conduits 122 and 123, respectively. Exit lines 125 and 126 pass the recovered gases through a pair of compressors 127 and 128 respectively.

The gas fraction containing the highest percentage of methane is collected from a vapor space 130 existing above the level of the liquid solvent in the housing 101. A conduit 131 passes the methane-rich fraction into a compressor 132.

The continuous expansion of gases as they rise with the solvent to the surface level, and the recovery of these gases at intermediate points makes possible the recovery of substantial amounts of power from the gaseous fractions. For example, in the operation of the system of Figure 2, assuming a flow of 1000 cubic feet of natural gas per minute at a temperature of about 25° C. and a pressure of about 1000 pounds per square inch gauge entering the system through the line 102, the reversible power contained in the gas stream is .26 horsepower per cubic foot per minute or a total horsepower of 260. The following table indicates the horsepower available when gaseous fractions are recovered at twelve different pressure levels:

| Pressure at trap, p. s. i. g. | Volume of gas recovered per. min., cu. ft. | H. P./cu. ft. | Total H. P. |
|---|---|---|---|
| 900 | 100 | 0.255 | 25.5 |
| 800 | 100 | .248 | 24.8 |
| 700 | 100 | .240 | 24.0 |
| 600 | 100 | .230 | 23.0 |
| 500 | 100 | .220 | 22.0 |
| 400 | 100 | .206 | 20.6 |
| 300 | 100 | .188 | 18.8 |
| 200 | 100 | .165 | 16.5 |
| 150 | 50 | .150 | 7.5 |
| 100 | 50 | .125 | 6.3 |
| 50 | 50 | .075 | 3.8 |
| 0 | 50 | 0 | 0 |
| | 1,000 | | 192.8 |

Since the available incoming energy was 260 horsepower and the recovered energy was 192.8 horsepower, approximately 74% of the energy contained in the gas is recovered. Thus, a plant of this type used in conjunction with a natural gas transmission system can remove most of the nitrogen while at the same time recovering most of the reversible energy available.

From the foregoing, it will be appreciated that the present invention provides a convenient and relatively inexpensive method for the recovery of enriched gaseous mixtures with a significant saving in power cost.

It will be understood that modifications and variations may be effected without departing from the scope of the novel concepts of the present invention.

I claim as my invention:

1. An apparatus for recovering a gas A enriched gas from a mixture of gases having a lower gas A content than the gas A enriched gas, which comprises means defining an upright chamber supporting a column of selective solvent for gas A, means feeding the solvent into the bottom of the column, means drawing off the solvent from the top of the column, means introducing said mixture of gases into the bottom of the column, means in said chamber defining a series of superimposed separating zones including gas collecting traps, means directing the solvent upwardly in said column through each of said separating zones, and draw-off means connected to each of said gas collecting traps and removing gases collected therein from said chamber.

2. An apparatus for recovering a gas A enriched gas from a mixture of gases having a lower gas A content than the gas A enriched gas, which comprises means defining an upright chamber supporting a column of selective solvent for gas A, means feeding the solvent into the bottom of the column, means drawing off the solvent from the top of the column, means introducing said mixture of gases into the bottom of the column, means in said chamber defining a series of superimposed separating zones including gas collecting traps, means directing the solvent upwardly in said column through each of said separating zones, draw-off means connected to each of said gas collecting traps and removing gases collected therein from said chamber, and means connected to the draw-off means of at least one of said traps for returning drawn-off gases to a separating zone below the trap from which the gases are drawn-off.

3. A process for recovering a gas A enriched gas from a mixture of gases having a lower gas A content than the gas A enriched gas, which comprises the steps of (1) intimately dispersing the mixture of gases in a selective solvent for gas A under pressure in an absorption zone, (2) separating and withdrawing the undissolved portions of the gases dispersed in the solvent in step (1), (3) flowing the solvent upwardly from the absorption zone to a first separation zone to reduce the pressure thereon in the first separation zone, (4) separating and withdrawing the undissolved portion of gases resulting from the reduced pressure in the first separation zone, (5) flowing the solvent upwardly additionally from the first separation zone to a second separation zone to further reduce the pressure thereon in the second separation zone, (6) separating and withdrawing the undissolved portion of gases resulting from the further reduced pressure in the second separation zone, and (7) recycling at least a portion of the undissolved gases separated and withdrawn from the solvent in the previous steps back into the solvent in said absorption zone to contact the solvent after the solvent has contacted said gas mixture.

4. An apparatus for recovering a gas A enriched gas from a mixture of gases having a lower gas A content than the gas A enriched gas, which comprises means defining an upright chamber supporting a column of selective solvent for gas A, means feeding the solvent into the bottom of the column, means introducing said mixture of gases into the bottom of the column, means defining an absorption zone receiving said mixture of gases at the bottom of the column, means directing the solvent downwardly in said absorption zone, means in said chamber defining a series of superimposed separating zones including gas collecting traps, means directing the solvent upwardly in said column through each of said separating zones, and draw-off means connected to each of said gas collecting traps and removing gases collected therein from said chamber.

5. An apparatus for recovering a gas A enriched gas from a mixture of gases having a lower gas A content than the gas A enriched gas, which comprises means defining an upright chamber supporting a column of selective solvent for gas A, means feeding the solvent into the bottom of the column, means drawing off the solvent from the top of the column, means introducing said mixture of gases into the bottom of the column, means in said chamber defining a series of superimposed separating zones including gas collecting traps, means directing the solvent upwardly in said column through each of said separating zones, draw-off means connected to each of said gas collecting traps and removing gases collected therein from said chamber, and means connected to the draw-off means of at least one of said traps for returning drawn-off gases to the bottom of the column beneath said means introducing said mixture of gases.

6. A process for recovering a gas A enriched gas from a mixture of gases having a lower gas A content than the gas A enriched gas, which comprises the steps of (1) intimately dispersing the mixture of gases in a selective solvent for gas A under pressure in an absorption zone, (2) separating and withdrawing the undissolved portions of the gases dispersed in the solvent in step (1), (3) flowing the solvent upwardly from the absorption zone to a first separation zone to reduce the pressure thereon in the first separation zone, (4) separating and withdrawing the undissolved portion of gases resulting from the reduced pressure in the first separation zone, (5) flowing the solvent upwardly additionally from the first separation zone to a second separation zone to further reduce the pressure thereon in the second separation zone, and (6) separating and withdrawing the undissolved portion of gases resulting from the further reduced pressure in the second separation zone.

References Cited in the file of this patent

UNITED STATES PATENTS

| | | |
|---|---|---|
| 562,052 | Waring | June 16, 1896 |
| 704,059 | Linton | July 8, 1902 |
| 1,836,659 | Gordon | Dec. 15, 1931 |
| 2,086,778 | Peffer et al. | July 13, 1937 |
| 2,217,429 | Balcar | Oct. 8, 1940 |
| 2,316,026 | Stahly | Apr. 6, 1943 |
| 2,540,905 | Newbauer et al. | Feb. 6, 1951 |
| 2,596,785 | Nelly et al. | May 13, 1952 |

FOREIGN PATENTS

| | | |
|---|---|---|
| 494,053 | Belgium | Mar. 15, 1950 |

OTHER REFERENCES

Publication: Perry's "Chemical Engineers Handbook," first edition, pages 592–593.